United States Patent [19]

Reimerdes

[11] 4,432,997
[45] Feb. 21, 1984

[54] PROCESS FOR PRODUCING AROMA-CONTAINING FOOD PRODUCTS

[75] Inventor: Ernst H. Reimerdes, Kiel, Fed. Rep. of Germany

[73] Assignee: Dr. Otto Suwelack NACHF. GmbH & Co., Fed. Rep. of Germany

[21] Appl. No.: 350,041

[22] Filed: Feb. 18, 1982

[30] Foreign Application Priority Data

Feb. 20, 1981 [DE] Fed. Rep. of Germany ....... 3106250

[51] Int. Cl.$^3$ .................... A23C 9/12; A23C 21/02; A23L 1/22
[52] U.S. Cl. .................................. 426/7; 426/34; 426/41; 426/42; 426/56; 426/533; 426/650
[58] Field of Search .............. 426/32, 34, 35, 41, 426/42, 52, 56, 59, 7, 533

[56] References Cited

U.S. PATENT DOCUMENTS

| | | | |
|---|---|---|---|
| 3,048,490 | 8/1962 | Lundstedt | 426/41 X |
| 3,072,488 | 1/1963 | Watts, Jr. et al. | 426/34 |
| 3,100,153 | 8/1963 | Knight | 426/35 |
| 3,667,968 | 6/1972 | Kasik et al. | 426/34 X |
| 4,001,437 | 1/1977 | Jaeggi et al. | 426/34 |
| 4,133,895 | 1/1979 | Kosikowski et al. | 426/42 X |
| 4,244,971 | 1/1981 | Wargel et al. | 426/35 |
| 4,362,750 | 12/1982 | Swartz | 426/59 |

FOREIGN PATENT DOCUMENTS

| | | | |
|---|---|---|---|
| 147499 | 11/1979 | German Democratic Rep. | 426/35 |
| 465165 | 9/1975 | U.S.S.R. | 426/34 |

*Primary Examiner*—Robert A. Yoncoskie
*Attorney, Agent, or Firm*—Roylance, Abrams, Berdo & Goodman

[57] ABSTRACT

The invention relates to a process for producing aroma-containing food products in which exogenously and/or endogenously formed enzyme complexes are separated from specific pure or mixed cultures of microorganisms, which develop certain characteristic flavoring and aromatizing agents. The enzyme complexes are subsequently added to an aqueous solution or suspension of a substrate. The isolated enzyme complexes are optionally concentrated or standardized beforehand under careful conditions. The mixture of the substrate and enzyme complexes subsequently undergoes biochemical rapid ripening under suitable conditions until the desired aromatizing and flavoring agent concentration is obtained. The biochemical rapid ripening is then terminated by substantial inactivation of the enzyme complexes. The ferment solution or suspension obtained and which contains the desired flavoring and aromatizing substances, can be added to basic food substances for aromatizing them.

11 Claims, No Drawings

PROCESS FOR PRODUCING AROMA-CONTAINING FOOD PRODUCTS

The present invention relates to a process for producing aroma-containing food products and in particular a high-speed process in which aroma development is made possible without the usual long storage and ripening or maturing time.

In the conventional production of aroma-containing foods, e.g. cheese in which in each case specific aromatizing and flavouring substances are formed in a fermenting process by the action of certain microorganisms on the basic food substance, e.g. curd or cheese fragments, whilst maintaining given climatic conditions, such as temperature and relative atmospheric humidity, the aromatizing and flavouring substances are produced during a relatively long storage period, dependent on the desired end product and which is in general 4 to 6 weeks or even longer. The conventional production of such aroma-containing food products consequently requires considerable expenditure as regards time and storage space, as well as a constant supervision of the storage conditions, which are therefore time-consuming and expensive.

Numerous attempts have been made to improve the conventional production processes and in particular to shorten the long ripening periods without any significant reduction in the quality of the end product. However, it has been found that faster ripening, e.g. through adding a larger quantity of culture substrates is only made possible by considerably reducing the keeping qualities of the end products.

Various processes have already been proposed for reducing the ripening time, but they have largely been limited to the production of aroma-containing dairy products. Thus, for example, DE-OS No. 2,652,558 discloses a process for producing aromatic soured butter in which butter grain is produced by churning an unsoured cream. An aromatic starter, obtained by the action of corresponding microorganisms on a low-fat dairy product, and a non-aromatic acid concentrate obtained by microbial conversion of a low-fat dairy product are kneaded into the said butter grain. In addition to the actual churning or butter-making process, in this case two microbial conversion processes take place side by side, but independently of one another, for producing aromatizing or flavouring products on the one hand and the non-aromatic acid concentrate on the other. Thus, the process is relatively costly as regards time, equipment and labour.

U.S. Pat. No. 3,048,490 describes a process for producing aromatizing and flavouring additives for dairy products in which a sterile, citrate-enriched cheese whey, preferably cottage cheese is inoculated at a pH of 5 to 7 with a citrate-fermenting microbial strain (*Streptococcus diacetilactis*) and is then ripened. The product obtained is added in small quantities to conventionally product cottage cheese and during the normal three-day storage up to sale produces in the latter a more intense flavour and odour aroma. Thus, this process only makes it possible in a special cheese production case, to render more intense the formation of aroma and flavour, without significantly reducing the storage and ripening time.

Other known processes also relate to the intensification of cheese aromas, particularly cheddar cheese aroma. Thus, e.g. German Pat. No. 1,913,853 describes a process in which a rennet curd obtained from the souring of milk is suspended and the suspension mixed with non-toxic micrococci and is then allowed to ripen or mature until a cheddar cheese aroma is obtained with an intensity corresponding to 100 times that of a 1 year old natural cheddar. The ripening time is 5 to 7 days, so that in spite of the intensification of the aroma, there is no significant reduction of the storage and ripening time.

In another process for producing cheese and cheese-like products described in DE-OS No. 2,850,635 a substrate is used, which comprises an edible, liquid protein-fat-salt composition, which is essentially free from lactose, e.g. milk or dairy products from which the lactose has been removed. According to the flow diagram of FIG. 1 of this DE-OS, the substrate is a whole milk separated into skim milk and cream. Part of the milk protein is hydrolyzed with a protease, accompanied by the formation of the cheese flavour and/or aroma components and their precursors. The hydrolyzed protein product is mixed with the substantially non-hydrolyzed protein-fat-salt composition. In parallel to this, part of the cream or the butter fat contained in the cream is hydrolyzed by lipase, accompanied once again by the formation of cheese flavour or aroma components. The fermented cream product is then combined with the essentially non-hydrolyzed cream. The cream product is then brought together again with the skim milk product and the mixture is processed to cheese in per se known manner. Unlike in conventional cheese production, according to this known process only parts of the total protein and milk fat are hydrolyzed in order to rapidly produce the cheese flavour or aroma and the precursors for it. The fermentation of the protein is preferably performed with known cheese producing organisms. At least part of the milk fat in the cream is treated with lipases, as normally used in cheese production.

Thus, in the aforementiond known process, part of the flavour and aroma formation takes place in the milk prior to the formation of cheese fragments, but it is impossible to obviate the following conventional cheese production process. Thus, this known process also only serves to assist aroma formation in conventional cheese production and due to the separate pretreatment of cream and skim milk, followed by the combination of the two substrates, considerable additional expenditure is required.

The problem of the present invention is to provide a process for the production of aroma-containing food products in which the ripening time can be considerably reduced, whilst still fully developing the aroma in the food product. The aforementioned disadvantages of the known processes, particularly the greatly reduced keeping qualities of the end products, are to be wholly or at least substantially avoided.

According to the invention, this problem is solved by a process for producing aroma-containing food products, wherein (a) the exogenously and/or endogenously formed enzyme complexes are separated from specific pure or mixed cultures of microorganisms suitable for developing specific aromatizing and flavouring agents, (b) the separated enzyme complexes, optionally concentrated or standardized under careful conditions are added to an aqueous solution or suspension of a substrate whose composition, based on the solids, optionally=corresponds to that of the basic food substance to be aromatized, (c) the mixture obtained undergoes biochemical high-speed ripening in an open or closed container under conditions suitable for the formation of aromatizing nd flavouring agents, the duration of the action of the enzyme complexes on the substrate essentially depending on the activity of the specific enzymes, the substrate composition, the concentrations of the individual components, the temperature used and the obtainable or desired concentration of the aromtic substances formed, (d) on reaching the desired aromatizing and flavouring agent concentration, biochemical high-speed ripening is terminated by extensive inactivation of the enzyme complexes, and, (e) the ferment solution or suspension containing the desired aromatizing and flavouring agents and optionally after prior careful concentration or drying and/or standarization is added to the basic food substance to be aromtized or some other food product to be aromatized in an adequate quantity for bringing about the desired aromtization and, if desired, this can be followed by a balancing period or a further ripening of the end product.

Thus, the inventive process is based on the idea of performing the speed-determining stage of producing specific aromatizing and flavouring agents by microbial fermentation separately from further processes for producing aroma-containing food products under conditions which make it possible to much more rapidly produce the flavouring and aromatizing agents in a much higher concentration than is possible in the case of much longer ripening and storage periods in conventional processes, where the corresponding fermentation takes place in the actual food product.

Earlier attempts to aromatize foods with separated enzymes such as lipases and proteinases have not led to the desired results and the products which were in fact obtained were unsatisfactory from the aroma standpoint. It is clear that in the case of one-sided aroma development, only a few aroma components occur, which in no way correspond to the very varied and characteristic composition and action of a full aroma. As opposed to this, the present invention permits a full aroma development specific for the particular food product through the use of the complete aroma-specific enzyme complex.

In order to obtain the aroma and flavour rating characteristic of the particular food product as completely as possible, it is necessary to start with pure or mixed cultures of microorganisms which are known to produce the enzymes or enzyme complexes under whose action proteins, carbohydrates and optionally fats are fermented to give the desired characteristic aromatizing and flavouring agents. These pure or mixed cultures are preferably cultured under the ripening conditions specific for the particular flavouring and aromatizing agents. This ensures that the exogenously and/or endogenously formed enzyme complexes correspond as accurately as possible to the enzyme spectrum responsible for developing the characteristic flavour and aroma in a food product ripened in the conventional manner.

A further embodiment of the process of the invention, which is advantageous with respect to the enzyme complex composition comprises culturing the pure or mixed cultures of microorganisms in a product-specific nutrient medium. Since in general it is known before performing the process according to the invention which food product or basic food substance is to be aromatized, it is advantageous to match the composition of the nutrient medium from the pure or mixed cultures to the products to be aromatized. If, e.g. dairy products, e.g. fresh cheese or curds are to be aromatized preferably whey and/or milk or their constituents are used as at least part of the nutrient medium for producing flavouring and aromatizing substances for aromatizing said dairy products.

It is a feature of the process according to the invention that it can be used not only for aromatizing dairy products, but also other food products in which the flavouring and aromatizing agents are normally produced by fermentation. Thus, the process according to the invention opens up new possible uses. Thus, it is possible with the aid of the process according to the invention to give e.g. meat and sausage products which have hitherto acquired their product-specific aroma and flavour by storage and ripening for weeks or even months through the action of specific microorganisms, a full, product-specific aroma in a much shorter time. According to a preferred embodiment of the present process, the culturing of suitable pure or mixed cultures of microorganisms for producing aromatizing and flavouring agents for aromatizing meat and sausage products in a nutrient medium, at least part of which is preferably constituted by meat juice and/or meat homogenate and/or blood serum or constituents thereof.

The choice of the suitable microorganism cultures for performing the process of the invention is naturally dependent on the particular food product which is to be aromatized. The pure or mixed cultures of microorganisms conventionally used in the production of dairy products, particularly cheese are the best known. A distinction must be made between the actual aroma developing agents and the pure lactic acid organisms. There is no need for the latter because, instead of ripening for e.g. 24 hours with lactic acid bacteria, it is also possible to adjust the pH value by previously adding a certain quantity of an acid, generally lactic acid, or adding e.g. gluconolactone (GDL) to the basic food substance. Aroma developing agents such as *Streptococcus cremoris, Streptococcus lactis* and *Streptococcus diacetilactis* are particularly suitable for performing the process of the invention. Other suitable cultures are *Penicillium camemberti, Penicillium glaucum* and *Penicillium roqueforti*, as well as *Bacterium linens* (=*Brevibacterium linens*). Lactic acid organisms of the Lactobacillaceae groups are also suitable, provided that they are aroma developing agents, besides serving for lactic acid fermentation, examples being *Lactobacillus helveticus, Lactobacillus casei, Lactobacillus lactis, Lactobacillus thermophilus.* These include all known cultures or mixed cultures of microogranisms suitable for producing aromatizing and flavouring agents.

If the food product to be aromatized is a meat or sausage product inter alia lactic acid bacteria, micrococci, pediococci, e.g. *Pediococcus cerevisiae* can be used as the microorganism cultures.

The above microorganism culture listing is not claimed to be limitative. They are in fact only examples of a large number of other suitable cultures and on the basis of the teaching of the present invention, it will not be difficult for the Expert to ascertain which microorganisms can be used for the specific aromatizing of a particular food product.

When performing the process according to the invention, it is necessary, as a function of the requirements, the grow the microorganisms responsible for producing particular aromatizing and flavouring agents in pure or mixed cultures using optimum nutrient media. The microorganisms form the enzymes or enzyme complexes, which are to be separated in definite endogenous or exogenous manner. If the enzymes are already present in the nutrient medium, they can be separated by simple filtration or separation from the microorganism followed by careful preparation in per se known manner. However, part of the enzymes is enclosed in the microorganisms and can only be freed from them by destroying the microorganisms, e.g. by their disintegration by ultrasonics or some similar process. The cell constituents are then removed in per se known manner and the total enzyme complexes are separated.

In this way, e.g. the enzymes from the cell-free medium are enriched to a concentrate by ultrafiltration and/or dried by lyophilization. However, the enzymes can also be isolated by protein precipitation, e.g. through acetone or ammonium sulphate precipitation. As a function of the pretreatment, e.g. the partial inactivation by heating or the isolation method used, enzyme products with different aroma capacities are obtained.

If the food product to be aromatized is a dairy product, the exogenously and/or endogenously formed enzyme complexes are isolated from pure or mixed cultures of microorganisms preferably used in cheese-making. If the food product to be aromatized is a meat or sausage product, it is advantageous to isolate the exogeneously and/or endogenously formed enzyme complexes from pure or mixed cultures of microorganisms forming enzyme complexes important for producing aromatizing and flavouring agents in meats and sausages.

The aforementioned preferred embodiments of the inventive process, particularly the choice of whey and/or milk for forming at least part of the nutrient medium when the enzymes or enzyme complexes formed are to be used for producing flavouring and aromatizing agents for aromatizing dairy products, or the choice of meat juice and/or meat homogenate and/or blood serum for forming at least part of the nutrient medium when the enzymes formed are to be used for aromatizing meats and sausages serve to produce product-related to product-specific flavouring agents in accordance with the purity requirements and regulations. Account is also taken of the fact that introducing enzyme concentrates from nutrient medium residues can enter the product and that aromatizing and flavouring agents are formed at the time of culturing the microorganism.

When it is intended to aromatize dairy products, at least part of the nutrient medium can consist of whey constituents, cream, whole, skim or dried milk. When aromatizing meat products, it is recommended that meat pastes, serum proteins, etc. and/or decomposed proteins e.g. peptones are used as part of the nutrient medium for culturing the microorganisms. The optimum nutrient medium can contain 5 to 20% by weight of solids. Prior to culturing, the nutrient medium is advantageously sterilized by heating, e.g. for 30 minutes at 60° to 65° C. corresponding to long-term pasteurization, or can undergo sterile filtration in order to prevent undesired developments and eliminate foreign enzymes to the greatest possible extent. If protein denaturation is required for culturing or growing the microorganisms, heating to an even higher temperature can take place.

The culturing or growing of the selected microorganisms appropriately takes place under specific optimum conditions for the development of the microorganisms. They are generally in the temperature range 15° to 37° C. and information thereon is generally obtainable from the manufacturer of the microorganism type used or the relevant literature. According to a particularly preferred embodiment of the process according to the invention, the culturing of the selected pure or mixed cultures of the particular microorganisms is performed in such a way that the optimum nutrient medium for the particular culture type is inoculated with an initially very high number of bacteria and the enzyme formation and growth phase is kept as short as possible. The conditions prevailing in the case of mixed cultures can be gathered from the product circumstances. It can generally be assumed that enzyme products suitable for the process of the invention can generally only be obtained if culturing or growing the microorganism cultures takes place under optimum conditions. The particular conditions to be used such as temperature, atmospheric humidity, pH-value in the nutrient medium, aerobic or anaerobic conditions, nutrient medium requirement, as well as the nature of the technical culturing plants, e.g. whether there is to be a surface culture of a submerged culture, etc are dependent on the nature of the microorganisms and the desired enzymes or enzyme complexes. The optimum conditions for each microorganism pure or mixed culture must be individual determined by the Expert on the basis of preliminary tests.

The separated and optionally concentrated and standardized enzymes or enzyme complexes are added to a substrate solution or suspension, whose composition corresponds to the product composition of the unripened basic food substance to be aromatized and based on the solids. As a result, a so-called bioconcentrate (aroma concentrate) is obtained in which is incorporated the characteristically composed total complex of biochemical metabolites and food matrix representing the aroma component. Through adding a predetermined suitable quantity of this bioconcentrate to the raw product to be aromatized, it is possible to considerably reduce the ripening time of the product, whilst specifically controlling the aroma structure of the food products in the desired way. The process of the invention surprisingly leads to food products having a characteristic and fully formed aroma of the desired type, and such as can only be obtained by conventional processes as a result of long-term ripening. In spite of the greatly reduced ripening and storage time, an acceptable consistency and much better keeping qualities and comparable products rapidly ripened by conventional processes are obtained. When individual enzymes, e.g. proteases or lipases are used with the process of the invention, they do not lead to the desired results, particularly with respect to the fully formed aroma.

Generally, in the conventional product of aroma-containing foods, particularly cheese products, the product is initially produced in its final basic structure. Thus, e.g. in the conventional production of cheese, the preliminary treatment is followed in particular by standardization and heat treatment of the cheese milk, its souring, followed by the ladling and shaping out of the cheese fragment. The shaped cheese fragment is a mass of varying firmness, whose basic structure is substantially complete. According to conventional processes, this product then undergoes a varying storage period, during which the product matures as the product-specific aroma forms. During this ripening process, complicated biochemical processes take place, which are started and continued by the already present or subsequently added microorganisms. These processes take place under specific climatic conditions and require a relatively large amount of time.

As opposed, to this, the process according to the invention shows a way of considerably reducing the long ripening process, whilst still obtaining food products with a full product-specific aroma. This advantage of the present process compared with known processes for the production of cheese and/or cheese-like products is obtained without increased expenditure on equipment and labour. It leads to a product of comparable quality as regards aroma and consistency to that obtained by the hitherto known processes as a result of long-term ripening.

As has been stated hereinbefore, the process of the invention can be used in many different ways. Thus, the process of the invention makes it possible to simulate at high speed all the procedures which also take place in conventional processes. Thus, all the microorganism cultures used in corresponding conventional processes can be generally used for the process of the invention, e.g. the above-mentioned microorganism types. In each case, the aroma-specific microorganism types in the form of pure or mixed cultures are selected from the large number of such types which are available and are used individually or in combination with other suitable cultures.

As the production of aromatizing and flavouring agents involves extremely complicated fermentation processes, a satisfactory result can only be obtained when they are completed in a much shorter time, as with the inventive process, if all the necessary stages are carefully performed and coordinated. For a successful outcome of the process, it is important for the biochemical processes to be performed in product and aroma-specific manner as described hereinbefore, otherwise undesired aromas or off-flavours can form. The accelerated ripening made possible by the present process also means that, unlike in conventional processes where it is possible to work with raw materials having a reduced content of water, instead, following their isolation the enzyme complexes act on substrate suspensions having a corresponding composition, but a higher water content than the basic food substance.

After aromatizing the particular basic food substance or some other desired food product the enzymes or enzyme complexes can be denatured, e.g. by heating, for increasing the time during which the flavour and aroma can be maintained. Products treated in this way can also be stored at ambient temperature whereas cold storage is required if the enzymes are left unchanged in the products. Which of these possibilities is used is dependent on the product and the possibilities for its storage and distribution.

Thus, the process according to the invention makes it possible to convert at high speed substantially aroma-free products into top-quality, aroma-containing products through incorporating corresponding product-specific aroma concentrates. The products obtained maintain an aroma structure, which is very similar to that of a comparable product ripened and stored in a conventional manner. Thus, e.g. if the aroma-free basic food substance is a dairy product, e.g. cheese, the resulting aroma-containing food product has an aroma like that of a typical cheese. In a similar manner, by using enzyme complexes of corresponding microorganism cultures, an aroma-containing food product can be obtained which has an aroma structure corresponding to that of a typical sausage aroma.

Thus, the aroma concentrates produced according to the inventive process can be used for producing top-quality foods, which are just as good as traditional products. The ripening and storage times are considerably reduced, enabling the process to be performed less expensively and optionally continuously. The process of the invention also makes it possible to produce aromas, like those resulting from surface ripening, e.g. of Tilsit cheese, Romadur and Salami, or by localized fermentation, such as e.g. of Roquefort cheese. The present process also makes it possible to solve problems which have occurred as a result of modern mass product and new processing forms, such as foil ripening. An advantage of the process is that the end products have a quality like that of traditional flavour structures.

The process of the invention is explained in greater detail hereinafter.

In order to produce a food product with a specific flavour and aroma from a substantially aroma-free basic food substance using the process of the invention, firstly a microorganism pure or mixed culture specific to the desired aroma type is selected and then a suitable nutrient medium is prepared for this culture and brought to the optimum culturing conditions. Advantageously, the nutrient medium is adapted to the basic food substance to be aromatized with respect to the pH-value, salt and substrate components (e.g. the protein and carbohydrate components). If the basic food substance is a dairy product, the nutrient medium should if possible contain caseins, casein hydrolyzates and other milk constituents, because such additives assist product-specific enzyme development.

The nutrient medium is pasteurized in per se known manner in order to reduce the number of undesired natural bacteria. The nutrient medium is then cooled to the optimum incubation temperature, fed into a fermenter and then the selected microorganisms are grown in accordance with the most favourable growth and fermentation conditions determined during preliminary tests. During incubation, the enzymes or enzyme complexes responsible for forming the specific aromatizing and flavouring agents are exogenously and/or endogenously formed from the microorganisms. Up to maximum biomass formation, incubation is performed under the optimum conditions, which can be determined by the Expert during preliminary tests.

For example, when culturing the aroma developing agent *Streptococcus cremoris* in a nutrient medium consisting of pasteurized or flash-pasteurized skim milk with approximately 10 to 20% by weight solids, inoculation takes place with 5 to 50 g of *Streptococcus cremoris* per 1000 g of skim milk. Incubation appropriately takes place in an open or closed fermenter for 6 to 24 hours, at a temperature between 20° and 40° C. and a pH between 4 and 6. Both before and during incubation, the inoculated nutrient medium can be stirred and gassed with oxygen, air or some other suitable gas, it being possible to specifically control the stirring and gassing. In this way, more than $10^{10}$ bacteria/g of nutrient medium can be obtained.

This is followed by the separation of the enzymes or enzyme complexes. Firstly, the cells are removed by centrifuging and cell-free filtration. Then the enzymes present in the nutrient medium are separated in per se known manner and concentrated and standardized optionally by vacuum or freeze-drying or some other careful drying method. The endogenous enzymes in the biomass must be decomposed by a special treatment, e.g. by the ultrasonic destruction of the cells, high-pressure disintegration, autolysis or other appropriate processes. The cell constituents are then removed by filtration and optionally washed out. The enzymes are then separated from the filtrate in the aforementioned manner and further processed. This can also be brought about by isolating the enzyme with ion exchangers or other chromatographic methods or by precipitation processes, e.g. solvent precipitation, followed by careful drying to highly enriched, biospecific enzyme concentrates. If desired, it is also possible to directly use the separated enzyme complexes. The enzymes or enzyme complexes, optionally in the form of enzyme concentrates obtained in this way have the specific composition required for forming aromatic substances giving the desired flavour and aroma.

If desired, the enzyme composition can be varied within certain limits by selected subsequent treatment methods, e.g. by matched heat treatment and/or solvent and/or salt treatment and as a result a gradually graded partial inactivation of the enzymes or enzyme complexes is obtained.

The isolated and optionally concentrated enzyme complex solutions are now added to a substrate solution or suspension. The composition of the substrate corresponds to the product composition of the solid, unripened basic food substance, which is to be aromatized. It is important that the substrate to be fermented is dissolved and/or suspended in an adequate amount of water, this being a prerequisite for good miscibility of the enzyme complexes with the substrate particles and consequently for rapid aroma development. The substrate to be fermented is preferably contained in the solution or suspension in a quantity of up to 50% by weight.

Fermentation is performed under optimum conditions for enzyme complexes and substrate and, if necessary, they can be determined beforehand during preliminary tests. Generally, the substrate and enzyme complexes are left to biochemically rapidly ripen in open or closed troughs or containers.

For example, if the substrate used is a conventionally prepared basic cheese mass mixed in a weight ratio of 1:1 to 1:10 with whey, permeate, retentate and/or water, the mixture is homogenized and undergoes long-term or flash pasteurization. After cooling to an incubation temperature favourable for the enzyme product to be used and which is preferably in the range 20° to 40° C., approximately 1 to 20 parts of the dried or 5 to 100 parts of the liquid enzyme product, based on the total quantity of suspension to be reacted (ripening preparation) are added, followed by incubation for 6 to 48 hours. If large quantities of highly volatile aromatic substances are formed, this appropriately takes place in a closed fermenter. The formation of the necessary atmosphere must be ensured by adding oxygen, nitrogen or $CO_2$. By taking regular samples, it is possible to follow and control aroma formation through the analysis and determination of the characteristic aroma control substances such as lactic acid, acetoin, diacetyl or free amino acids of the particular amines.

Aroma formation starts after a short time and can be continuously checked during rapid ripening by regular sampling operations and analyses, because generally one or more of the characteristic control substances for the particular known aroma type to be produced are known. Checking can be carried out relatively simply and rapidly and has proved very reliable for this particular process stage. Thus, aroma formation during the biochemical rapid ripening process in accordance with the present invention, is therefore preferably controlled by means of control substances characteristic of the particular aromatizing and flavouring agents and optionally by headspace analysis.

As aroma formation is an extremely complicated biochemical process, which reacts very sensitively to changes in the process conditions, it is advantageous to determine by trial runs the optimum conditions for the particular substrate and enzyme complexes. Only in this way is it possible to ensure that the overall complex of formed aromatic substances in the main process at the end of rapid ripening is in accordance with expectations, i.e. is at least very close to a "genuine" aroma or flavour formed in conventional manner by long-term ripening.

The desired aroma formation takes place within a few hours and the action period is dependent on the nature of the enzyme complexes, the substrate composition and the concentrations used. The time for ending or breaking off aroma formation is determined by analytical methods, e.g. by determining the free fatty acid content of the solution by headspace analysis. Rapid ripening is appropriately stopped by suitable denaturation of the enzymes, preferably by flash-pasteurization. The rapidly ripened product is subject to short-time heating in the flow process to a temperature above 80° C., preferably to flash or HTST pasteurization at about 120° to 140° C. for about 1 to 15 seconds, but for no more than 1 minute, the enzymes being substantially inactivated. The aroma concentrates obtained can then be stored in a sterile state.

According to a further development of the process according to the invention, in cases where the food product to be aromatized is heated, the separated and optionally concentrated and/or standardized enzyme complexes are directly added to the basic food substance prior to heating and as a result rapid ripening is performed. On reaching the desired degree of aromatization, this can be terminated by short-time heating. The aromatized product obtained in this way can either be directly used or further processed as an aroma carrier. In the latter case, rapid ripening will only be brought to an end, when the product is highly enriched with the desired flavouring and aromatizing agents.

The last-mentioned process can be used with particular advantage when producing sausage products and processed chesses. This is particularly so in the latter case because the broken structure (relatively fresh basic substance) desired for the melting process can be produced in a highly planned manner.

The ferment solution or suspension with the desired flavouring and aromatizing agents obtained by the process of the invention need not be directly added to the basic food substances to be aromatized or some other food product. Instead, it can be dried in a suitable manner, e.g. by lyophilization and can be added to the dried mixture as an aromatic substance, for example in the case of a cheese aroma in the form of cheese flakes and can then be used for producing food products to be aromatized such as e.g. pastries, sauces, etc. If the aroma-containing substrate, optionally after standardization has taken place is added in predetermined empirical quantities to the correspondingly prepared basic substance, the latter momentarily acquires the desired aroma, such as would only be obtained after ripening for weeks or months when using conventional production procedures. As stated hereinbefore, the basic substance can be a delay product, e.g. cheese fragments or curds or some other, e.g. dough-containing or meat-containing product, whose consistency is such that the aroma-containing substrate solution or suspension can be homogeneously distributed or dispersed in the basic substance. As a function of the product type, following the addition of aroma, short secondary ripening or drying can take place.

The invention is further illustrated by the following examples.

EXAMPLE 1

(a) For producing a food product with a specific cheese aroma in accordance with the process of the invention, Streptococcus cremoris was chosen as the aroma developing agent. 1000 g of skim milk containing 18.8% solids were used as the nutrient medium for this culture. The nutrient medium was firstly pasteurized and then cooled to 32° C. in a sterile fermenter, followed by inoculation with 49.5 g of a Streptococcus cremoris culture, whilst maintaining the aforementioned temperature. The inoculated skim milk was then stirred for about 30 minutes in order to uniformly disperse the bacteria, whilst maintaining the temperature of 32° C. Incubation then took place at 32° C. for 24 hours at a pH-value of 5.8 in the closed fermenter.

Following 24 hours incubation, an adequate quantity of biomass had formed and this was centrifuged. The enzymes and proteins were enriched in the centrifugate by ultrafiltration in a ratio of 1:5. The liquid concentrate could be directly used for aromatizing the basic food substance or could be dried beforehand by lyophilization.

One part of centrifuged biomass was in each case dispersed in 5 parts of ultrafiltered whey and then disintegrated by ultrasonic treatment. The undissolved cell constituents were centrifuged and the centrifuged containing the enzymes and proteins processed in the aforementioned manner.

(b) The unripened basic cheese substance to be aromatized was prepared in a conventional manner, e.g. in accordance with the process control plan for producing Edam cheese.

500 parts by weight of this basic cheese substance were mixed with 3000 parts by weight of ultrafiltered whey, followed by homogenization of the mixture and long-term pasteurization. After cooling to 33.5° C., the homogenized mixture was mixed in a sterile fermenter with 15 parts of the lyophilized enzyme product from stage (a). The mixture was then incubated for 24 hours at 33° C. in the closed fermenter, accompanied by stirring and under a nitrogen atmosphere. During incubation, aroma formation was checked and controlled by regular sampling and determination of the content of free fatty acids, diacetyl and specific amines serving as aroma control substances, as well as by protein degradation in the samples.

After 24 hours, the desired concentration of the aromatic substance formed was achieved and biochemical rapid ripening was brought to an end by HTST pasteurization when the enzymes were largely inactivated. The ferment suspension obtained had a full and characteristic cheese aroma.

(c) 10 g of the aroma-containing ferment suspension obtained were incorporated into 100 g of unripened basic cheese substance. Following homogenization, it was possible to establish by means of a sample that the incorporated quantity of ferment led to the desired standard values for the peptides and diacetyl in the chesse product. The homogenate was then incubated for 12 hours at 33.5° C. in order to uniformly obtain the full aroma action in all parts of the cheese substance. Incubation was then broken off in the aforementioned manner, followed by lyophilization of the cheese product obtained and then its further processing to cheese flakes.

EXAMPLE 2

(a) Lactobacillus plantarum is chosen as the acid and aroma developing agent for producing a food product with a typical sausage aroma in accordance with the process of the invention. The nutrient medium for this culture was 1000 g of blood serum with 5% meat peptone as an additive. This nutrient medium was sterilized by long-term pasteurization (95° C., 60 minutes) and was then cooled to 40° C. in a sterile fermenter. At this temperature, it was inoculated with 40 g of Lactobacillus plantarum culture. The inoculated substrate was then stirred for about 10 minutes in order to uniformly disperse the bacteria and whilst maintaining a temperature of 40° C. Further incubation took place in the fermenter for 30 hours and a pH value of 5.0, whilst maintaining the above temperature.

Following this incubation time, the biomass was centrifuged. The centrifugate was carefully concentrated in a ratio of 1:5 and dried. These products could be directly used for aroma formation in a basic food substance.

One part of the centrifuged biomass was dispersed in in each case 5 parts of water and then homogenized by ultrasonic treatment. This was followed by centrifuging from the cellular material and the centrifugate was concentrated 1:5 by ultrafiltration or lyophilization.

(b) The unripened basic sausage substance to be aromatized was produced in a conventional manner, e.g. according to the process control plan for raw sausage. 150 parts by weight of this raw sausage were mixed with 1000 parts by protein-free blood serum produced by ultrafiltration. The mixture was then carefully homogenized and then flash-pasteurized for sterilization purposes. After cooling to 38° C., the homogenized mixture was mixed in a sterile fermenter with 50 parts of lyophilized nutrient medium centrifugate and 160 parts of concentrated biomass centrifugate (cf a)) in a ratio of 1:5. This was followed by incubation for 12 hours in a closed fermenter, accompanied by stirring and under a carbon dioxide atmosphere. During incubation, aroma formation was regularly controlled by sampling through determining the liberated amino acid content.

After 12 hours biochemical rapid ripening was terminated. The enzymes were substantially inactivated by flash-pasteurization. Inactivation was controlled by measuring the proteolytic activity by means of an amino acid-4-nitro-analide mixture.

The ferment suspension obtained had a concentrated, full sausage flavour.

(c) 10 g of the aroma-containing ferment suspension obtained were used in place of water or ice in the production of 100 g of raw sausage. After processing, it was established by means of a sample that the desired standard values for amino acids and lactic acid were obtained with the incorporated quantity of ferment. The raw sausage obtained was then further processed in the conventional manner.

I claim:

1. A process for producing aroma-containing food products comprising
   (a) separating exogenously or endogenously formed enzyme complexes from cultures of microorganisms suitable for developing specific aromatizing and flavoring agents,
   (b) adding the separated enzyme complexes to an aqueous solution or suspension of a substrate whose composition corresponds to that of the basic food stuff to be aromatized,
   (c) permitting the resultant mixture to undergo biochemical high speed ripening under conditions suitable for the formation of aromatizing and flavoring agents,
   (d) terminating the biochemical high speed ripening by extensive inactivation of the enzyme complexes after the desired aromatizing and flavoring agent concentration has been reached, and
   (e) adding the ferment solution or suspension containing the desired aromatizing and flavoring agents to a food substance to be aromatized in sufficient quantity to bring about aromatization.

2. A process according to claim 1, wherein the cultures of microorganisms are cultured under conditions specific to the particular flavouring and aromatizing agents.

3. A process according to claims 1 or 2, wherein the cultures of microorganisms are cultured in a product-specific nutrient medium.

4. A process according to claim 3, wherein whey and/or milk is used as at least part of the nutrient medium for producing flavouring and aromatizing agents for aromatizing dairy products.

5. A process according to claim 3, wherein meat juice and/or meat homogenate and/or blood serum is used as at least part of the nutrient medium for producing flavouring and aromatizing agents for aromatizing meat and sausage products.

6. A process according to claim 1, wherein the exogenously or endogenously formed enzyme complexes are separated from the cultures of standard cheese-making microorganisms.

7. A process according to claim 1, wherein the exogenously or endogenously formed enzyme complexes are separated from cultures of microorganisms, which form the enzyme complexes essential for producing the flavouring and aromatizing substances in meat and sausage products.

8. A process according to claim 1, wherein culturing of the selected cultures takes place in such a way that the optimum nutrient medium for the particular culture type is inoculated with the maximum initial number of bacteria and the enzyme formation and growth phase is kept as short as possible.

9. A process according to claim 1, wherein the solution or suspension contains up to 50% by weight of the substrate to be fermented.

10. A process according to claim 1, wherein during the biochemical rapid ripening process, aroma formation is controlled by analysis of control substances characterizing the particular aromatizing and flavouring agents and by headspace analysis.

11. A process according to claim 1, wherein the biochemical rapid ripening is terminated by flash-pasteurization.

* * * * *